(12) United States Patent
Ishihara et al.

(10) Patent No.: US 9,431,689 B2
(45) Date of Patent: Aug. 30, 2016

(54) METAL-AIR CELL PROVIDED WITH GEL-FORM SOLID ELECTROLYTE

(71) Applicants: NISSAN CHEMICAL INDUSTRIES, LTD., Tokyo (JP); KYUSHU UNIVERSITY, Fukuoka-shi, Fukuoka (JP)

(72) Inventors: Tatsumi Ishihara, Fukuoka (JP); Shigeru Mitsui, Funabashi (JP); Nobuhide Miyachi, Chiyoda-ku (JP)

(73) Assignees: NISSAN CHEMICAL INDUSTRIES, LTD., Tokyo (JP); KYUSHU UNIVERSITY, Fukuoka (JP)

( * ) Notice: Subject to any disclaimer, the term of this patent is extended or adjusted under 35 U.S.C. 154(b) by 46 days.

(21) Appl. No.: 14/351,729

(22) PCT Filed: Oct. 12, 2012

(86) PCT No.: PCT/JP2012/076527
§ 371 (c)(1),
(2) Date: Apr. 14, 2014

(87) PCT Pub. No.: WO2013/054922
PCT Pub. Date: Apr. 18, 2013

(65) Prior Publication Data
US 2014/0295296 A1    Oct. 2, 2014

(30) Foreign Application Priority Data
Oct. 14, 2011   (JP) .................. 2011-226882

(51) Int. Cl.
*H01M 4/38*      (2006.01)
*H01M 12/08*     (2006.01)
*H01M 4/90*      (2006.01)
*H01M 4/92*      (2006.01)

(52) U.S. Cl.
CPC ............. *H01M 12/08* (2013.01); *H01M 4/382* (2013.01); *H01M 4/9016* (2013.01); *H01M 4/9083* (2013.01); *H01M 4/926* (2013.01); *H01M 2300/0025* (2013.01); *H01M 2300/0037* (2013.01); *H01M 2300/0085* (2013.01); *Y02E 60/50* (2013.01)

(58) Field of Classification Search
CPC . H01M 4/382; H01M 4/9016; H01M 4/9083
USPC .................................................. 429/402–405
See application file for complete search history.

(56) References Cited

U.S. PATENT DOCUMENTS

2003/0165743 A1 *   9/2003   Horikiri ................ G02F 1/1525
                                                        429/300

FOREIGN PATENT DOCUMENTS

| JP | A-2007-42532  | 2/2007   |
|----|---------------|----------|
| JP | A-2008-198590 | 8/2008   |
| JP | A-2010-3694   | 1/2010   |
| JP | A-2010-176907 | 8/2010   |
| JP | A-2010-176941 | 8/2010   |
| JP | 2010-287390   | * 12/2010 |
| JP | A-2010-287390 | 12/2010  |
| JP | A-2012-186055 | 9/2012   |

OTHER PUBLICATIONS

International Search Report issued in International Application No. PCT/JP2012/076527 mailed Jan. 15, 2013.

* cited by examiner

*Primary Examiner* — Edward Cain
(74) *Attorney, Agent, or Firm* — Oliff PLC (57) ABSTRACT

There is provided a lithium-air secondary cell having an air electrode, a negative electrode containing metal lithium or a lithium-containing material and a gel-form solid electrolyte, wherein the gel-form solid electrolyte contains a solid electrolyte salt, a solvent, and a specific lipid peptide-type gelator composed.

13 Claims, 7 Drawing Sheets

METAL-AIR CELL PROVIDED WITH GEL-FORM SOLID ELECTROLYTE

TECHNICAL FIELD

The present invention relates to a metal-air cell provided with a gel-form solid electrolyte, particularly to a lithium-air cell, and more particularly to a lithium-air secondary cell provided with an ionic conductive gel-form solid electrolyte using a low molecular weight lipid peptide-type gelator.

BACKGROUND ART

Lithium-air cells do not need to store positive electrode active materials inside of the cells because they utilize, as a positive electrode active material, oxygen in the air that can be provided from outside of the cells. Therefore, a large amount of lithium metals that are negative electrode active materials can be charged in the cells to acquire extremely large discharge capacities, whereby the cells are expected to be driven for a long period of time.

For example, in Patent Document 1, a lithium-air (oxygen) cell is evaluated by producing an electrolyte solution in which 1 mol/L of lithium bis(trifluoro methanesulfonyl)imide (LiTFSI) is used as a solute, and a mixed solvent of ethylene carbonate and diethyl carbonate is used as an organic solvent.

In Patent Document 2, a lithium-air cell is produced with an electrolyte solution in which 1 mol/L lithium hexafluorophosphate ($LiPF_6$) is used as a solute, and a mixed solvent of ethylene carbonate and diethyl carbonate is used as an organic solvent, and is evaluated.

In both documents, the produced lithium-air cells have extremely large discharge capacities compared to those of common lithium ion cells.

However, the organic solvent, which is one of the components of the electrolyte solution in the lithium ion cells of these documents, is not only volatile, but also has some miscibility with water, and thus these cells do not seem to be stable when they work for a long time. Specifically, while these cells work for a long time, their electrolyte solutions are predicted to be volatilized from the positive electrode sides so that the cell resistance increases. In addition, oxygen and water may enter the cells to corrode lithium metals that are negative electrodes and to generate hydrogen. These events may impair a long time discharge, which is the characteristic of lithium-air cells.

To solve such disadvantages, Patent Document 3 describes a lithium-air cell using a lithium ionic conductive solid electrolyte instead of an electrolyte solution. However, the lithium-air cell works only at a relatively high temperature, such as 95° C.

In contrast, Patent Document 4 describes a lithium-air cell using two types of electrolyte solutions in order to prevent water intrusion into the negative electrode. One of the electrolyte solutions is an electrolyte solution of an organic solvent placed on the negative electrode side, and the other is an electrolyte solution of an aqueous solution placed on the air electrode side. In the lithium-air cell, the electrolyte solution of an organic solvent placed on the negative electrode side and the electrolyte solution of an aqueous solution placed on the air electrode side are separated with a solid electrolyte (separator) that conducts only lithium ions. This inhibits water permeation from the air electrode side to the negative electrode side, offering a superior level of safety.

However, in this system, the electrolyte solution (of an organic solvent) on the negative electrode side and the electrolyte solution (of an aqueous solution) on the air electrode side are required to be prepared independently, and the electrolyte solutions are required to be separated from each other with the lithium ion solid electrolyte. Thus, manufacturing of the cell may become complicated. In addition, the capacity may be limited because the aqueous solution serves as an electrode active material for the air electrode.

PRIOR ART DOCUMENTS

Patent Documents

Patent Document 1: Japanese Patent Application Publication No. 2010-176907 (JP 2010-176907 A)
Patent Document 2: Japanese Patent Application Publication No. 2008-198590 (JP 2008-198590 A)
Patent Document 3: Japanese Patent Application Publication No. 2010-3694 (JP 2010-3694 A)
Patent Document 4: Japanese Patent Application Publication No. 2010-176941 (JP 2010-176941 A)

SUMMARY OF THE INVENTION

Problem to be Solved by the Invention

As described above, according to the conventional documents, the organic solvent used as one of the components of the electrolyte is volatile and has some miscibility with water and oxygen. The cells thus have issues on the stability when working for a long time.

Although improvements have been developed to solve these issues, satisfactory results are not yet obtained such that the operation conditions and the cell capacity are limited, and thus additional studies are needed.

The present invention has been completed in view of the above circumstances, and a problem to be solved by the present invention is to provide a novel lithium-air cell in which an organic solvent is less volatilized, and mixing of water is inhibited in order to overcome the issues of conventional liquid electrolytes.

Means for Solving the Problem

As a result of intensive study, the inventors of the present invention have found the use of a gel-form solid electrolyte including: a lipid peptide gelator having a low molecular weight lipid peptide or a pharmaceutically acceptable salt thereof; a solid electrolyte salt; and a solvent, as a solid electrolyte for a lithium-air cell. The use of the gel-form solid electrolyte can inhibit volatilization of an organic solvent, mixing of water, and the like, which are disadvantages of conventional electrolytes, and allows good ionic conductivity and charge and discharge properties to be obtained that are equal to those of a cell using a conventional liquid electrolyte. The present invention has thus been completed.

Specifically, as a first aspect, the present invention relates to a lithium-air secondary cell characterized by comprising: an air electrode; a negative electrode containing metal lithium or a lithium-containing material; and a gel-form solid electrolyte, in which the gel-form solid electrolyte contains a solid electrolyte salt, a solvent, and a lipid peptide-type gelator composed of at least one of compounds of Formulae (1) to (3):

(1)

(where $R^1$ is a $C_{9-23}$ aliphatic group, $R^2$ is a hydrogen atom or a $C_{1-4}$ alkyl group optionally having a $C_1$ or $C_2$ branched chain, $R^3$ is a —$(CH_2)_n$—X group, n is a number of 1 to 4, and X is an amino group, a guanidino group, a —$CONH_2$ group, a 5-membered ring optionally having 1 to 3 nitrogen atoms, a 6-membered ring optionally having 1 to 3 nitrogen atoms, or a condensed heterocycle that is composed of a 5-membered ring and a 6-membered ring and optionally has 1 to 3 nitrogen atoms), (2)

(where $R^4$ is a $C_{9-23}$ aliphatic group, each of $R^5$ to $R^7$ is independently a hydrogen atom, a $C_{1-4}$ alkyl group optionally having a $C_1$ or $C_2$ branched chain, or a —$(CH_2)_n$—X group, n is a number of 1 to 4, and X is an amino group, a guanidino group, a —$CONH_2$ group, a 5-membered ring optionally having 1 to 3 nitrogen atoms, a 6-membered ring optionally having 1 to 3 nitrogen atoms, or a condensed heterocycle that is composed of a 5-membered ring and a 6-membered ring and optionally has 1 to 3 nitrogen atoms), (3)

(where $R^8$ is a $C_{9-23}$ aliphatic group, each of $R^9$ to $R^{12}$ is independently a hydrogen atom, a $C_{1-4}$ alkyl group optionally having a $C_1$ or $C_2$ branched chain, or a —$(CH_2)_n$—X group, n is a number of 1 to 4, and X is an amino group, a guanidino group, a —$CONH_2$ group, a 5-membered ring optionally having 1 to 3 nitrogen atoms, a 6-membered ring optionally having 1 to 3 nitrogen atoms, or a condensed heterocycle that is composed of a 5-membered ring and a 6-membered ring and optionally has 1 to 3 nitrogen atoms), and pharmaceutically acceptable salts of the compounds.

As a second aspect, the present invention relates to the lithium-air secondary cell according to the first aspect, characterized in that the solvent contained in the gel-form solid electrolyte includes a chain carbonate ester and either a cyclic carbonate ester or an ether compound.

As a third aspect, the present invention relates to the lithium-air secondary cell according to the second aspect, in which the chain carbonate ester is selected from the group consisting of dimethyl carbonate, diethyl carbonate, and ethylmethyl carbonate.

As a fourth aspect, the present invention relates to the lithium-air secondary cell according to the second aspect, in which the cyclic carbonate ester is ethylene carbonate or propylene carbonate.

As a fifth aspect, the present invention relates to the lithium-air secondary cell according to the second aspect, in which the ether compound is 1,2-dimethoxyethane.

As a sixth aspect, the present invention relates to the lithium-air secondary cell according to the first aspect, characterized in that the solvent contained in the gel-form solid electrolyte includes a chain carbonate ester, a cyclic carbonate ester, and a cyclic carboxylate ester.

As a seventh aspect, the present invention relates to the lithium-air secondary cell according to the sixth aspect, in which the cyclic carboxylate ester is γ-butyrolactone.

As an eighth aspect, the present invention relates to the lithium-air secondary cell according to any one of the first to the seventh aspects, characterized in that the air electrode is composed by including a porous carbon or a fine carbon that supports, as a catalyst, at least one of noble metals selected from the group consisting of platinum, rhodium, palladium, silver, and ruthenium, and metal oxides selected from the group consisting of a perovskite oxide, a manganese oxide, a cobalt oxide, a nickel oxide, an iron oxide, and a copper oxide.

As a ninth aspect, the present invention relates to the lithium-air secondary cell according to the eighth aspect, characterized in that the air electrode is composed by including a porous carbon supporting a manganese oxide.

As a tenth aspect, the present invention relates to the lithium-air secondary cell according to any one of the first to the ninth aspects, characterized in that the negative electrode is metal lithium.

As an eleventh aspect, the present invention relates to the lithium-air secondary cell according to any one of the first to the tenth aspects, characterized in that the solid electrolyte salt contained in the gel-form solid electrolyte is applicable to a lithium ion secondary cell.

As a twelfth aspect, the present invention relates to the lithium-air secondary cell according to the eleventh aspect, in which the solid electrolyte salt is selected from the group consisting of $LiN(SO_2C_2F_5)_2$, $LiPF_6$, $LiBF_4$, $LiClO_4$, $LiAsF_6$, $LiCF_3SO_3$, $LiN(SO_2CF_3)_2$, and mixtures of any of $LiN(SO_2C_2F_5)_2$, $LiPF_6$, $LiBF_4$, $LiClO_4$, $LiAsF_6$, $LiCF_3SO_3$, and $LiN(SO_2CF_3)_2$.

Effects of the Invention

A lithium-air secondary cell using a gel-form solid electrolyte of the present invention has a high discharge capacity and good charge and discharge properties that are equivalent to those of conventionally developed lithium-air secondary cells using liquid electrolytes.

In the lithium-air secondary cell of the present invention, the electrolyte solution can be inhibited from leaking to the outside and being volatilized, and the electrode material (negative electrode) can be inhibited from being corroded because a gel-form solid electrolyte is used as the electrolyte. Also, in the gel-form solid electrolyte used as the electrolyte, lipid peptide serving as a gelator forms rigid network in a system so that mixing of water from an air electrode is inhibited.

The lipid peptide-type gelator has a polar group, such as amino group and a carboxyl group in its backbone to interact with a lithium ion, and thus dissociation of the lithium ion, and conduction of the lithium ion can be facilitated in an electrolyte. Thus, sufficient ionic conduction of the lithium ion can be obtained even in a gelatinized condition (condition in which the flowability is completely lost).

MODES FOR CARRYING OUT THE INVENTION

The present invention relates to a lithium-air secondary cell provided with at least an air electrode serving as a positive electrode, a negative electrode containing metal lithium or a lithium-containing material, and a gel-form solid electrolyte (hereinafter, also simply called a gel electrolyte). The gel electrolyte is a gel-form solid electrolyte including a solid electrolyte salt, a solvent, and a lipid peptide-type agent including at least one of the compounds of Formulae (1) to (3) and pharmaceutically acceptable salts thereof.

In particular, the main characteristic of the present invention is that a gel-form solid electrolyte including a lipid peptide-type gelator is used as an electrolyte for a lithium-air secondary cell.

Each of the constituents will be explained below.

[Air Electrode (Positive Electrode)]

Any of conventional air electrodes which have been developed as positive electrodes for lithium-air secondary cells can be used as an air electrode for the lithium-air secondary cell of the present invention. An example thereof is an air electrode in which a catalyst for a positive electrode is supported on a carbon material.

Examples of the catalyst for a positive electrode include noble metals selected from the group consisting of platinum, rhodium, palladium, silver, and ruthenium, and metal oxides selected from the group consisting of perovskite oxides, manganese oxides, cobalt oxides, nickel oxides, iron oxides, and copper oxides.

The carbon material usable includes carbon blacks such as Ketjen black (registered trademark) and acetylene black; and porous carbon or fine carbon, such as activated charcoal, graphite, and carbon fiber.

Among air electrodes used in the present invention, porous carbon or fine carbon on which a manganese oxide is supported is preferably used as a catalyst for a positive electrode.

Specifically, an air electrode is formed by pressure-bonding, onto a current collector, a positive electrode material in which an organic binder is added to the catalyst for a positive electrode and a carbon material.

The organic binder usable includes polytetrafluoroethylene, polyvinylidene fluoride, and carbon fiber. The current collector usable includes stainless mesh, nickel mesh, and gold mesh.

[Negative Electrode]

A negative electrode for the lithium-air secondary cell of the present invention usable includes metal lithium, or a lithium-containing material such as lithium carbon, lithium silicon, lithium aluminum, lithium indium, lithium tin, and lithium nitride.

Of these, metal lithium is preferably used as the negative electrode.

Specifically, the negative electrode may be formed by pressure-bonding metal lithium or a lithium-containing material onto a current collector such as stainless mesh, or by forming metal lithium or a lithium-containing material into a desired shape, for example, a plate shape.

[Gel-Form Solid Electrolyte]

<Lipid Peptide-Type Gelator>

In the present invention, any of the compounds of Formulae (1) to (3) (lipid peptides) or pharmaceutically acceptable salts thereof (low molecular weight compounds having lipid portions that are hydrophobic moieties and peptide portions that are hydrophilic moieties) can be used as a lipid peptide-type gelator for a gel-form solid electrolyte.

(1)

In Formula (1), $R^1$ is a $C_{9-23}$ aliphatic group, and preferably a $C_{11-23}$ straight chain aliphatic group having 0 to 2 unsaturated bonds.

Specific examples of $R^1$ and an adjacent lipid portion composed of a carbonyl group (acyl group) include a lauroyl group, a dodecylcarbonyl group, a myristoyl group, a tetradecylcarbonyl group, a palmitoyl group, a margaroyl group, an oleoyl group, an elaidoyl group, a linoleoyl group, a stearoyl group, a vaccenoyl group, an octadecylcarbonyl group, an arachidoyl group, an eicosylcarbonyl group, a behenoyl group, an alkanoyl group, a docosylcarbonyl group, a lignoceyl group, and a nervonoyl group. Particularly preferable examples thereof include a lauroyl group, a myristoyl group, a palmitoyl group, a margaroyl group, a stearoyl group, an oleoyl group, an elaidoyl group and a behenoyl group.

In Formula (1), $R^2$ contained in the peptide portion is a hydrogen atom or a $C_{1-4}$ alkyl group optionally having a $C_{1-2}$ branched chain.

The $C_{1-4}$ alkyl group optionally having a $C_{1-2}$ branched chain means an alkyl group that has a $C_{1-4}$ main chain and optionally has a $C_{1-2}$ branched chain. Specific examples thereof include a methyl group, an ethyl group, an n-propyl group, an i-propyl group, an n-butyl group, an i-butyl group, a sec-butyl group, and a tert-butyl group.

$R^2$ is preferably a hydrogen atom or a $C_{1-3}$ alkyl group optionally having a $C_1$ branched chain, and more preferably a hydrogen atom.

The $C_{1-3}$ alkyl group optionally having a $C_1$ branched chain means an alkyl group that has a $C_{1-3}$ main chain and optionally has a $C_1$ branched chain. Specific examples thereof include a methyl group, an ethyl group, an n-propyl group, an i-propyl group, an i-butyl group, and a sec-butyl group, and preferably include a methyl group, an i-propyl group, an i-butyl group, and a sec-butyl group.

In Formula (1), $R^3$ is a —$(CH_2)_n$—X group. In the —$(CH_2)_n$—X group, n is a number of 1 to 4, and X is an amino group, a guanidino group, a —$CONH_2$ group, a 5-membered ring optionally having 1 to 3 nitrogen atoms, a 6-membered ring optionally having 1 to 3 nitrogen atoms, or a condensed heterocycle that is composed of a 5-membered ring and a 6-membered ring and optionally has 1 to 3 nitrogen atoms.

In the —$(CH_2)_n$—X group of $R^3$, X is preferably an amino group, a guanidino group, a carbamoyl group (a —$CONH_2$ group), a pyrrole group, an imidazole group, a pyrazole group, or an indole group, and more preferably an imidazole group. In the —$(CH_2)_n$—X group, n is preferably 1 or 2, and more preferably 1.

Accordingly, the —$(CH_2)_n$— group is preferably an aminomethyl group, a 2-aminoethyl group, a 3-aminopropyl group, a 4-aminobutyl group, a carbamoylmethyl group, a 2-carbamoylethyl group, a 3-carbamoylbutyl group, a 2-guanidinoethyl group, a 3-guanidinobutyl group, a pyrrolemethyl group, a 4-imidazolemethyl group, a pyrazolemethyl group, or a 3-indolemethyl group, more preferably a 4-aminobutyl group, a carbamoylmethyl group, a 2-carbamoylethyl group, a 3-guanidinobutyl group, a 4-imidazolemethyl group or a 3-indolemethyl group, and more preferably a 4-imidazole methyl group.

In the compound of Formula (1), lipid peptides particularly preferable as lipid peptide-type gelators are the compounds below that are formed with lipid portions and peptide portions (amino acid assembling portion). Note that abbreviations of amino acids are alanine (Ala), asparagine (Asn), glutamine (Gln), Glycine (Gly), histidine (His), isoleucine (Ile), leucine (Leu), lysine (Lys), tryptophan (Trp), and valine (Val). The compounds are lauroyl-Gly-His, lauroyl-Gly-Gin, lauroyl-Gly-Asn, lauroyl-Gly-Trp, lauroyl-Gly-Lys, lauroyl-Ala-His, lauroyl-Ala-Gln, lauroyl-Ala-Asn, lauroyl-Ala-Trp, lauroyl-Ala-Lys; myristoyl Gly-His, myristoyl-Gly-Gln, myristoyl-Gly-Asn, myristoyl-Gly-Trp, myristoyl-Gly-Lys, myristoyl-Ala-His, myristoyl-Ala-Gln, myristoyl-Ala-Asn, myristoyl-Ala-Trp, myristoyl-Ala-Lys; palmitoyl-Gly-His, palmitoyl-Gly-Gln, palmitoyl-Gly-Asn, palmitoyl-Gly-Trp, palmitoyl-Gly-Lys, palmitoyl-Ala-His, palmitoyl-Ala-Gln, palmitoyl-Ala-Asn, palmitoyl-Ala-Trp, palmitoyl-Ala-Lys; stearoyl-Gly-His, stearoyl-Gly-Gln, stearoyl-Gly-Asn, stearoyl-Gly-Trp, stearoyl-Gly-Lys, stearoyl-Ala-His, stearoyl-Ala-Gln, stearoyl-Ala-Asn, stearoyl-Ala-Trp, and stearoyl-Ala-Lys.

The most preferable compounds are lauroyl-Gly-His, lauroyl-Ala-His-myristoyl-Gly-His, myristoyl-Ala-His; palmitoyl-Gly-His, palmitoyl-Ala-His; stearoy-Gly-His, and stearoyl-Ala-His.

(2)

In Formula (2), $R^4$ is a $C_{9-23}$ aliphatic group, and preferable specific examples thereof include the groups same as those defined for $R_1$ above.

In Formula (2), each of $R^5$ to $R^7$ is independently a hydrogen atom, or a $C_{1-4}$ alkyl group optionally having a $C_1$ or $C_2$ branched chain, or a —$(CH_2)_n$—X group, and at least one of $R^5$ to $R^7$ is a —$(CH_2)_n$—X group. n is a number of 1 to 4, and X is an amino group, a guanidino group, a —$CONH_2$ group, or a 5-membered ring optionally having 1 to 3 nitrogen atoms, a 6-membered ring optionally having 1 to 3 nitrogen atoms, or a condensed heterocyclic group that is composed of a 5-membered ring and a 6-membered ring and optionally has 1 to 3 nitrogen atoms. Preferable specific examples of $R^5$ to $R^7$ include the groups same as those defined for $R^2$ and $R^3$ of above.

In the compound of Formula (2), lipid peptides particularly preferable are the following compounds that are formed with lipid portions and peptide portions (amino acid assembling portion): myristoyl-Gly-Gly-His, myristoyl-Gly-Gly-Gln, myristoyl-Gly-Gly-Asn, myristoyl-Gly-Gly-Trp, myristoyl-Gly-Gly-Lys, myristoyl-Gly-Ala-His, myristoyl-Gly-Ala-Gln, myristoyl-Gly-Ala-Asn, myristoyl-Gly-Ala-Trp, myristoyl-Gly-Ala-Lys, myristoyl-Ala-Gly-His, myristoyl-Ala-Gly-Gln, myristoyl-Ala-Gly-Asn, myristoyl-Ala-Gly-Trp, myristoyl-Ala-Gly-Lys, myristoyl-Gly-His-Gly, myristoyl-His-Gly-Gly, palmitoyl-Gly-Gly-His, palmitoyl-Gly-Gly-Gln, palmitoyl-Gly-Gly-Asn, palmitoyl-Gly-Gly-Trp, palmitoyl-Gly-Gly-Lys, palmitoyl-Gly-Ala-His, palmitoyl-Gly-Ala-Gln, palmitoyl-Gly-Ala-Asn, palmitoyl-Gly-Ala-Trp, palmitoyl-Gly-Ala-Lys, palmitoyl-Ala-Gly-His, palmitoyl-Ala-Gly-Gln, palmitoyl-Ala-Gly-Asn, palmitoyl-Ala-Gly-Trp, palmitoyl-Ala-Gly-Lys, palmitoyl-Gly-His-Gly, and palmitoyl-His-Gly-Gly.

Among them, the most preferable compounds are lauroyl-Gly-Gly-His, myristoyl-Gly-Gly-His, palmitoyl-Gly-Gly-His, palmitoyl-Gly-His-Gly, palmitoyl-His-Gly-Gly, and stearoyl-Gly-Gly-His.

(3)

In Formula (3), $R^8$ is a $C_{9-23}$ aliphatic group, and preferable specific examples thereof include the groups same as those defined for $R^1$ of above.

In Formula (3), each of $R^9$ to $R^{12}$ is independently a hydrogen atom, or a $C_{1-4}$. alkyl group optionally having a $C_1$ or $C_2$ branched chain, or a —$(CH_2)_n$—X group, and at least one of $R^9$ to $R^{12}$ is a —$(CH_2)_n$—X group. n is a number of 1 to 4, and X is an amino group, a guanidino group, a —$CONH_2$ group, a 5-membered ring optionally having 1 to 3 nitrogen atoms, a 6-membered ring optionally having 1 to 3 nitrogen atoms, or a condensed heterocyclic group that is composed of a 5-membered ring and a 6-membered ring and optionally has 1 to 3 nitrogen atoms. Preferable specific examples of $R^9$ to $R^{12}$ include the groups same as those defined for $R^2$ and $R^3$ of above.

Accordingly, in the compound of Formula (3), particularly preferable examples of lipid peptides as preferable lipid peptide-type gelators include lauroyl-Gly-Gly-Gly-His, myristoyl-Gly-Gly-Gly-His, palmitoyl-Gly-Gly-Gly-His, palmitoyl-Gly-Gly-His-Gly, palmitoyl-Gly-His-Gly-Gly, palmitoyl-His-Gly-Gly-Gly, and stearoyl-Gly-Gly-Gly-His.

A lipid peptide-type gelator used in the present invention includes at least one of the compounds of Formulae (1) to (3) (lipid peptides) or pharmaceutically acceptable salts thereof, and these compounds can be used singly, or two or more of them can be used in combination as a gelator.

In a gel-form solid electrolyte used for the lithium-air secondary cell of the present invention, the ratio of the lipid peptide-type gelator is 0.1% to 30% by mass, and preferably 15% to 20% by mass of the total mass of an obtained gel-form solid electrolyte.

<Solid Electrolyte Salt>

A solid electrolyte salt applicable to lithium ion secondary cells can be used for a gel-form solid electrolyte in the present invention. Specific examples thereof include LiN$(SO_2C_2F_5)_2$ [also called LiBETI], LiPF$_6$, LiBF$_4$, LiCLO$_4$, LiAsF$_6$, LiCF$_3$SO$_3$ [also called LiTFS], LiN$(SO_2CF_3)_2$ [also called LiTFSI], and mixtures thereof.

In the present invention, a solid electrolyte salt is used for an obtained gel-form solid electrolyte with a concentration of 0.01 mol/kg to 2 mol/kg, and preferably 0.1 mol/kg to 1 mol/kg.

<Solvent>

In the present invention, a solvent used for a gel-form solid electrolyte dissolves not only the aforementioned solid electrolyte salt, but also the aforementioned lipid peptide-type gelator, and the solvent is gelated by the gelator. In addition, the solvent does not react with both of the solid electrolyte salt and the gelator.

In the gel-form solid electrolyte of the present invention, the ratio of the solvent is 30% to 98% by mass, and preferably 60% to 95% by mass of the total mass of an obtained gel-form solid electrolyte.

In the present invention, an organic solvent can be suitably used as the solvent, and the organic solvent is preferably a two-type mixed solvent containing at least two selected from the group consisting of cyclic carbonate esters, chain carbonate esters, ether compounds, and cyclic carbonate esters, specifically containing a chain carbonate ester and either a cyclic carbonate ester or an ether compound; or a three-type mixed solvent containing a chain carbonate ester, a cyclic carbonate ester, and a cyclic carboxylate ester.

Examples of the chain carbonate ester include dimethyl carbonate (DMC), diethyl carbonate (DEC), and ethylmethyl carbonate.

Examples of the cyclic carbonate ester include ethylene carbonate, propylene carbonate, and vinylene carbonate.

An example of the ether compound is 1,2-dimethoxyethane.

Examples of the cyclic carboxylate ester include γ-butyrolactone and γ-valerolactone.

In the present invention, in addition to a chain or a cyclic carbonate ester, an ether compound, and a cyclic carboxylate ester, another solvent can also be contained as a third solvent.

Examples of such another solvent include aprotic polarity solvents such as N,N-dimethylformamide, dimethyl sulfoxide, N,N-dimethylacetamide, 1,3-dimethyl-2-imidazolidinone, N-methyl-2-pyrrolidone, and tetrahydrofuran; lower aliphatic alcohol solvents such as methanol, ethanol, n-propanol, and isopropanol; ether solvents such as 1,2-diethoxyethane (ethylene glycol diethyl ether); aliphatic ester solvents or aliphatic ester ether solvents, such as ethyl acetate, butyl acetate, methoxybutyl acetate, methyl cellosolve acetate, ethyl cellosolve acetate, and propylene glycol monomethyl ether acetate; and nitrile solvents such as acetonitrile.

Such another solvent is preferably contained at a ratio of 0% to 50% by mass of the total mass of all the solvents.

Specific examples of preferable combinations of these solvents include the two-type mixed solvent of dimethyl carbonate and 1,2-dimethoxyethane [a combination of a chain carbonate ester and an ether compound], the two-type mixed solvent of diethyl carbonate and ethylene carbonate [a combination of a chain carbonate ester and a cyclic carbonate ester], and the three-type mixed solvent of γ-butyrolactone, diethyl carbonate, and ethylene carbonate [a combination of a cyclic carboxylate ester, a chain carbonate ester, and a cyclic carbonate ester].

Preferable examples of the combination of the aforementioned solvent and the aforementioned solid electrolyte include a combination of the two-type mixed solvent of dimethyl carbonate and 1,2-dimethoxyethane, and LiN$(SO_2CF_3)_2$; a combination of the two-type mixed solvent of diethyl carbonate and ethylene carbonate, and LiN$(SO_2CF_3)_2$; and a combination of the three-type mixed solvent of γ-butyrolactone, diethyl carbonate, and ethylene carbonate, and LiN$(SO_2CF_3)_2$.

A preferable mixing ratio of the two-type mixed solvent of dimethyl carbonate and 1,2-dimethoxyethane is 10:90 to 90:10, more preferably 25:75, and most preferably 50:50, in % by mass.

A preferable mixing ratio of the two-type mixed solvent of diethyl carbonate and ethylene carbonate is 10:90 to 90:10, more preferably 20:80, and most preferably 25:75, in % by mass.

A preferable mixing ratio of the three-type mixed solvent of γ-butyrolactone, diethyl carbonate, and ethylene carbonate is 10% by mass or greater of γ-butyrolactone, 10% by mass or greater of diethyl carbonate, and the remaining of ethylene carbonate.

In the mixed solvent, the mixing ratio of γ-butyrolactone is preferably limited to not more than 33.3% by mass based on the mass of the mixed solvent, taking into account of cycle characteristics.

The preferable mixing ratio is 33.3% by mass or less of γ-butyrolactone, 20% by mass or more of diethyl carbonate, and the remaining of ethylene carbonate, and the most preferable mixing ratio is 33.3% by mass or less of γ-butyrolactone, 33.3% by mass or more of diethyl carbonate, and the remaining of ethylene carbonate.

<Manufacture of Gel-Form Solid Electrolyte>

A gel-form solid electrolyte used for the lithium-air secondary cell of the present invention can be obtained by a variety of methods. For example, the lipid peptide-type gelator and the solid electrolyte salt are heated and dissolved in the solvent to obtain a mixture (casting liquid). The temperature at the time of heating and dissolving may be any temperature so long as it is equal to, or less than the boiling point of the solvent.

Next, for example, an appropriate amount of the mixture is added dropwise onto a smooth surface, or poured into an appropriate mold, as needed, and then the mixture is cooled to a temperature equal to or less than room temperature, and left standing still to obtain a gel electrolyte.

EXAMPLES

The present invention will be explained in further detail according to examples and test examples; however, the present invention is not limited to these examples.

Synthesis Example 1

Synthesis of Lipid Peptide (N-Palmitoyl-Gly-His)

The lipid peptide used as the gelator in the Examples was synthesized as follows.

14.2 g (91.6 mmol) of histidine, 30.0 g (91.6 mmol) of N-palmitoyl-Gly-methyl, and 300 g of toluene were charged into a 500 mL four-neck flask, and 35.3 g (183.2 mmol) of 28% sodium methoxide methanol solution that is a base was added thereto. The resultant mixture was heated in an oil bath to 60° C., and stirred for 1 hour. After removing the oil bath, the solution was allowed to cool to 25° C., and re-precipitated with 600 g of acetone, and filtered to collect a solid. The obtained solid was dissolved in the mixed solution of 600 g of water and 750 g of methanol, and then 30.5 ml (183.2 mmol) of 6-normal hydrochloric acid was added thereto for neutralization to precipitate a solid, and the resultant mixture was filtered. The obtained solid was dissolved in the mixed solution of 120 g of tetrahydrofuran and 30 g of water at 60° C., and then 150 g of ethyl acetate was added thereto, and the resultant mixture was cooled from 60° C. to 30° C. After that, the precipitated solid was filtered. The obtained solid was then dissolved in the solvent of 120 g of tetrahydrofuran and 60 g of acetonitrile. The resultant solution was heated to 60° C., stirred for 1 hour, and then cooled and filtered. The obtained solid was washed with 120 g of water, filtered, and then dried under vacuum to obtain 26.9 g of the free form of N-palmitoyl-Gly-His (hereinafter, also simply called N-palmitoyl-Gly-His) as a white crystal (yield: 65%).

Example 1

Manufacture of Lithium-Sir Secondary Cell (1) and Charge and Discharge Test

<Air Electrode: KB/EMD/PTFE=75/15/10 (Mass Ratio)>

Electrolytic $MnO_2$ (EMD) (manufactured by Kojundo Chemical Laboratory Co., Ltd., 1.5 mg), Ketjen black (registered trademark) (KB) (EC600 JD, manufactured by Lion Corporation, 7.5 mg), and PTFE (polytetrafluoroethylene, manufactured by Aldrich Chemical Co., 1.0 mg) were mixed in a mortar, and the obtained pellet (10 mg) was pressure-bonded to a stainless mesh (SUS-3176, manufactured by The Nilaco Corporation, φ28 mm) to manufacture the air electrode.

<Negative Electrode>

The negative electrode was manufactured by pressure-bonding metal lithium (The Honjo Chemical Corporation, 1.0×1.2 cm) to a stainless mesh (SUS-3176, manufactured by The Nilaco Corporation, 1.0×1.2 cm).

<Electrolyte Solution>

Dimethyl carbonate (DMC, Kishida Chemical Co., Ltd., an organic solvent for lithium primary/secondary/polymer cells & lithium ion capacitors, 5.0 g) and 1,2-dimethoxyethane (DME, manufactured by Kishida Chemical Co., Ltd., an organic solvent for lithium primary/secondary/polymer cells & lithium ion capacitors, 5.0 g) were mixed. Subsequently, $LiN(SO_2CF_3)_2$ (manufactured by Kishida Chemical Co., Ltd., an electrolyte for lithium primary/secondary/polymer cells & lithium ion capacitors, 2.9 g) was dissolved in the mixed solvent to prepare the electrolyte solution (1 M $LiN(SO_2CF_3)_2$ DMC:DME=50:50 (wt %) solution).

<Lithium-Air Secondary Cell>

A lithium-air secondary cell 1, which was subjected to the charge and discharge test to be described later, was prepared by using a cell 2 whose one side is exposed to the atmosphere (see FIG. 1).

Firstly, a negative electrode 3 prepared in the method described above was placed at the bottom of the cell 2.

Next, 1.5 g (13%) of the lipid peptide-type gelator (N-palmitoyl-Gly-His) prepared in Synthesis Example 1 was added to 10.0 g of the electrolyte solution (1 M $LiN(SO_2CF_3)_2$ DMC:DME=50:50 (wt %) solution) prepared in the method described above. The resultant mixture was heated to 85° C. to dissolve the lipid peptide-type gelator to prepare a gel precursor solution. The gel precursor solution was added inside of the cell 2 in which the negative electrode 3 was placed. The gel precursor solution was gelated by cooling to room temperature, and become a gel-form solid electrolyte 4.

Two sheets of separators 5 (glass filter, Advantec Co. Ltd. GA-100) immersed overnight in the electrolyte solution were placed above the gel-form solid electrolyte 3, and an air electrode 6 prepared in the method described above was placed over the separators 5.

A perforated lid 8 made of stainless steel and having holes to intake the air was placed on the topside of the air electrode 6 placed, and thus the lithium-air secondary cell (1) was prepared.

<Charge and Discharge Test>

Figure 1:
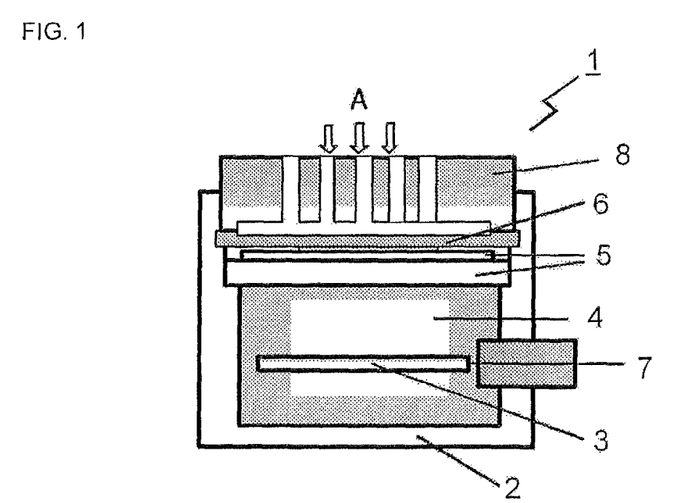
FIG. 1 is a schematic drawing of a lithium-air secondary cell manufactured in Examples.

As shown in FIG. 1, the charge and discharge test was conducted in the prepared lithium-air secondary cell (1), in which the negative electrode 3 side is used as a counter electrode (CE) and reference electrode (RE) 7 (the counter electrode serves also as the reference electrode), and the air electrode 6 side was used as a working electrode (WE) (the air electrode serves also as the working electrode).

The charge and discharge test was conducted at a constant current, a charge and discharge current density of 0.1 mA/cm$^2$, a voltage range of 2.0 V to 4.0 V, and a temperature of 25° C.

Figure 2:
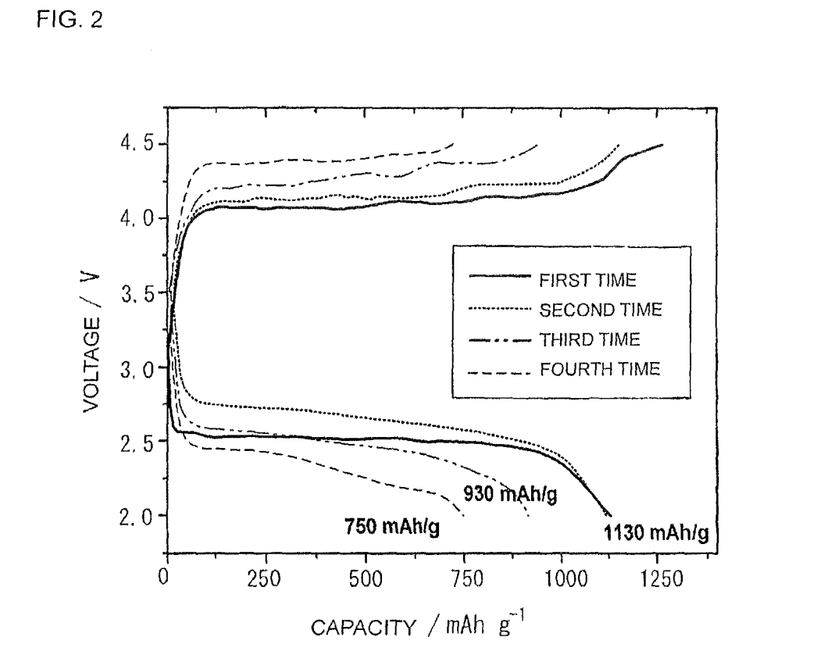
FIG. 2 is a graph showing results of the constant current charge and discharge test on a lithium-air secondary cell (1).

FIG. 2 shows the results of the constant current charge and discharge test on the lithium-air secondary cell (1) (4 cycles).

As shown in FIG. 2, the initial charge capacity of the lithium-air secondary cell (1) was 1130 mAh/g, and the capacity value was 750 mAh/g at the fourth cycle, which was still high.

Example 2

Manufacture of Lithium-air Secondary Cell (2) and Charge and Discharge Test

The lithium-air secondary cell (2) was prepared in the same manner as in Example 1 except that the compositions of the air electrode and the electrolyte solution were changed.

<Air Electrode: KB/EMD/PTFE=85/5/10 (Mass Ratio)>

Electrolytic $MnO_2$ (EMD) (manufactured by Kojundo Chemical Laboratory Co., Ltd., 0.5 mg), Ketjen black (registered trademark) (KB) (EC600 JD, manufactured by Lion Corporation, 8.5 mg), and PTFE (polytetrafluoroethylene, manufactured by Aldrich Chemical Co., 1.0 mg) were mixed in a mortar, and the obtained pellet (10 mg) was pressure-bonded to a stainless mesh (SUS-3176, manufactured by The Nilaco Corporation, φ28 mm) to manufacture the air electrode.

<Electrolyte Solution>

Diethyl carbonate (DEC, manufactured by Kishida Chemical Co., Ltd., an organic solvent for lithium primary/secondary/polymer cells & lithium ion capacitors, 2.5 g) and ethylene carbonate (EC, manufactured by Kishida Chemical Co., Ltd., an organic solvent for lithium primary/secondary/polymer cells & lithium ion capacitors, 7.5 g) were mixed. Subsequently, $LiN(SO_2CF_3)_2$ (manufactured by Kishida Chemical Co., Ltd., an electrolyte for lithium primary/secondary/polymer cells & lithium ion capacitors, 2.3 g) was dissolved in the mixed solvent to prepare the electrolyte solution (1 M $LiN(SO_2CF_3)_2$ DEC:EC=25:75 (wt %)).

<Charge and Discharge Test>

The charge and discharge test was conducted at a constant current, a charge and discharge current of 0.1 $mA/cm^2$, and a voltage range of 2.0 V to 4.5 V.

Figure 3:
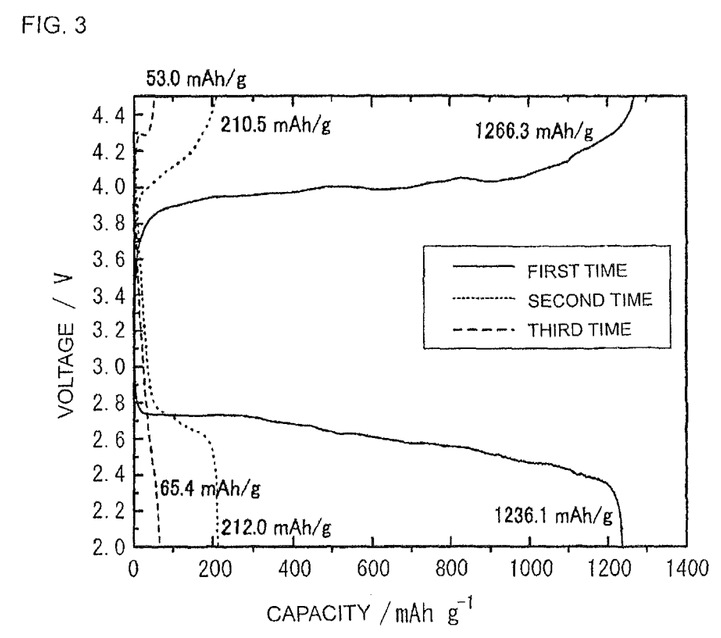
FIG. 3 is a graph showing results of the constant current charge and discharge test on a lithium-air secondary cell (2).

FIG. 3 shows the results of the constant current charge and discharge test on the lithium-air secondary cell (2) is shown (3 cycles).

Figure 4:
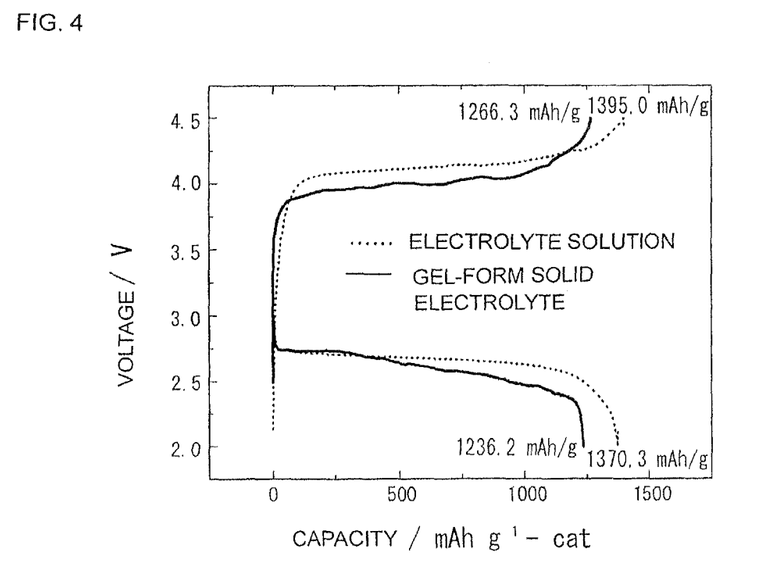
FIG. 4 is a graph showing results of the constant current charge and discharge test on the lithium-air secondary cell (2) and a cell using a liquid electrolyte (electrolyte solution).

Also, a lithium-air secondary cell was prepared by using the electrolyte solution (1 M $LiN(SO_2CF_3)_2$ DEC:EC=25:75 (wt %)) as it is (not gelated) instead of the gel-form solid electrolyte, and FIG. 4 shows the result of the initial charge and discharge test that was conducted at a charge and discharge current density of 0.2 $mA/cm^2$.

As shown in FIG. 3 and FIG. 4, both of the initial discharge capacity of the lithium-air secondary cell (2) and that of the cell using the electrolyte solution exceeded 1200 mAh/g, which shows that the cell using the gel-form solid electrolyte provides a discharge capacity comparable to that of the cell using the liquid electrolyte.

Note that, as shown in FIG. 4, the flat area of the electric potential of the cell using the gel-form solid electrolyte is slightly lower than that of the cell using the liquid electrolyte in both discharge and charge. This is presumed to be because diffusion of lithium ions in a gel is slower than that in a liquid.

However, FIG. 3 shows that the cycle characteristic of the lithium-air secondary cell (2) using the gel-form solid electrolyte was deteriorated. This is presumed to be caused because the contact of the gel electrolyte with both of the positive electrode (air electrode) and the negative electrode at the interfaces was decreased, in particular caused by remarkable increase of a resistance at the air electrode side. Improvement of the cycle characteristic is expected by improving the contact with the gel electrolyte at the air electrode side.

Example 3

Manufacture of Lithium-Air Secondary Cell (3) and Charge and Discharge Test

The lithium-air secondary cell (3) was prepared in the same manner as in the case of Example 1 except that the compositions of the air electrode and the electrolyte solution were changed.

<Air Electrode>

The air electrode used in Example 2 was used.

<Electrolyte Solution>

γ-butyrolactone (GBL, manufactured by Kishida Chemical Co., Ltd., an organic solvent for lithium primary/secondary/polymer cells & lithium ion capacitors, 3.3 g), DEC (manufactured by Kishida Chemical Co., Ltd., an organic solvent for lithium primary/secondary/polymer cells & lithium ion capacitors, 3.3 g), and EC (manufactured by Kishida Chemical Co., Ltd., an organic solvent for lithium primary/secondary/polymer cells & lithium ion capacitors, 3.3 g) were mixed. Subsequently, $LiN(SO_2CF_3)_2$ (manufactured by Kishida Chemical Co., Ltd., an electrolyte for lithium primary/secondary/polymer cells & lithium ion capacitors, 2.9 g) was dissolved in the mixed solvent to prepare the electrolyte solution (1 M $LiN(SO_2CF_3)_2$ GBL:DEC:EC=1:1:1 (mass ratio)).

<Charge and Discharge Test>

The charge and discharge test was conducted at a constant current, a charge and discharge current of 0.1 $mA/cm^2$, and a voltage range of 2.0 V to 4.5 V.

Figure 5:
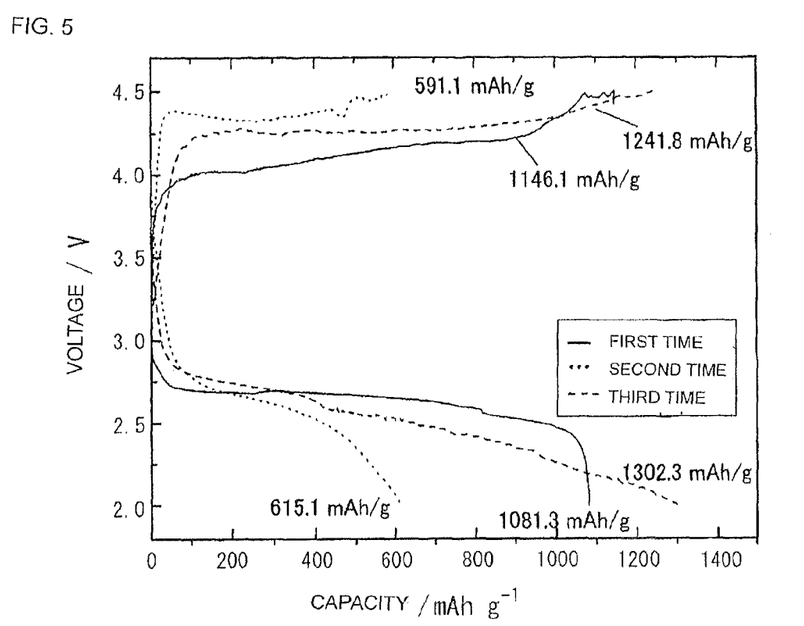
FIG. 5 is a graph showing results of the constant current charge and discharge test on a lithium-air secondary cell (3).

FIG. 5 shows the result of the constant current charge and discharge test on the lithium-air secondary cell (3) (3 cycles).

As shown in FIG. 5, the initial charge and discharge capacity of the lithium-air secondary cell (3) exceeded 1000 mAh/g, and although the capacity was decreased at the second cycle, the capacity value at the third cycle again exceeded 1000 mAh/g that is a high capacity value. The results of further charge and discharge tests showed that charge and discharge were possible over 10 cycles.

The result showed that the cycle characteristic observed to be deteriorated in Example 2 can be improved by adding γ-butyrolactone to the electrolyte solution used in Example 2.

Example 4

Manufacture of Lithium-Air Secondary Cell (4), Charge and Discharge Test Including Prolonged Resting Time Period, and Alternating Current Impedance Measurement The lithium-air secondary cell (4) was prepared in the same manner as in Example 1 except that the compositions of the air electrode and the electrolyte solution were changed.

<Air Electrode>

The air electrode used in Example 2 was used.

<Electrolyte Solution>

The electrolyte solution used in Example 3 was used.

<Charge and Discharge Test and Alternating Current Impedance Measurement>

The charge and discharge test was conducted at a constant current, a charge and discharge current density of 0.1 $mA/cm^2$, and a voltage range of 2.0 V to 4.5 V.

Note that a prolonged resting time period was provided after each of charge and discharge. Specifically, the cell was rested at 2.5 V for 24 hours after discharge was completed, and was rested at 4.3 V for 24 hours after charge was completed.

Also, alternating current impedance was measured after discharge was completed (the measurement instrument: an electrochemical analyzer Solartron 1280+1267, manufactured by Solartron Analytical Company).

Figure 6:
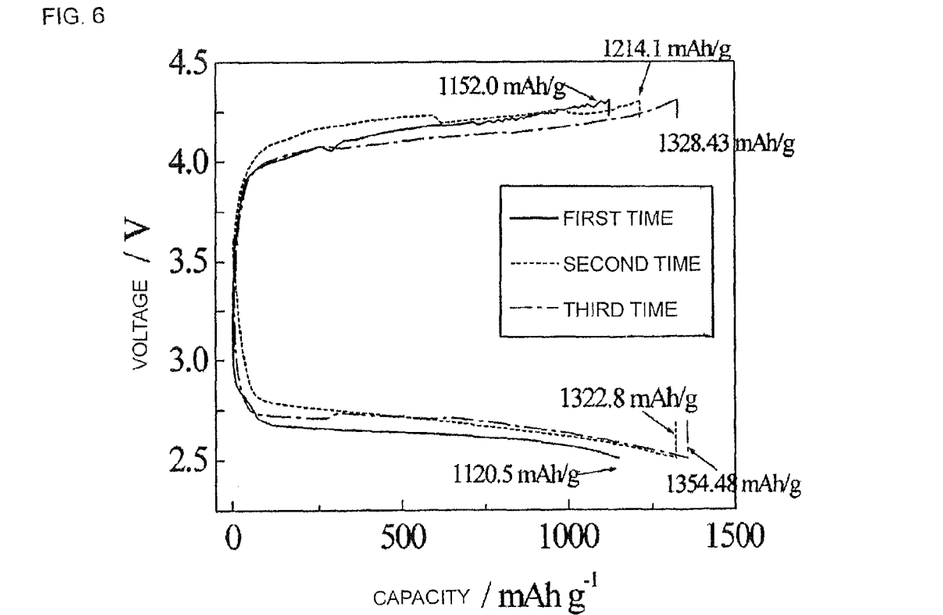
FIG. 6 is a graph showing results of the constant current charge and discharge test on a lithium-air secondary cell (4).
Figure 7:
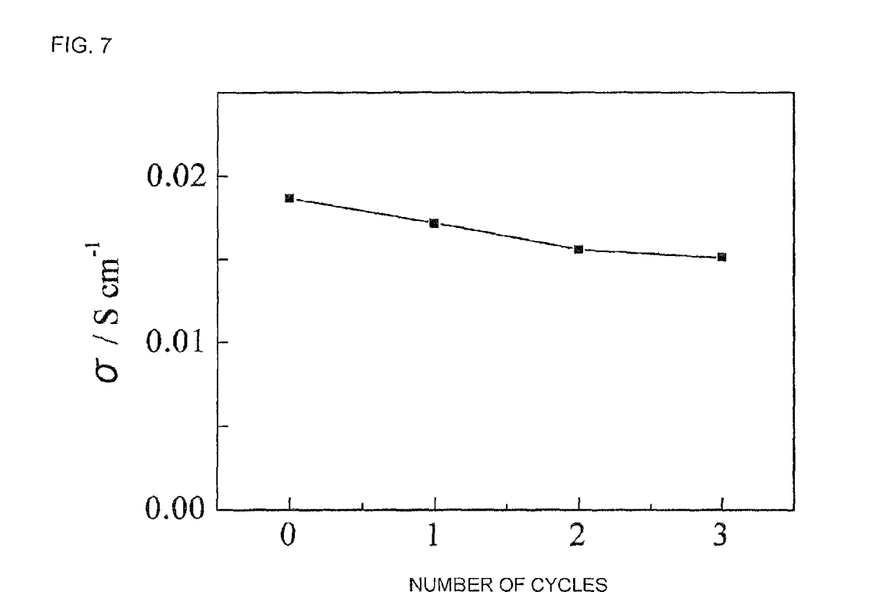
FIG. 7 is a graph showing conductivity of a gel-form solid electrolyte obtained by the alternating current impedance measurement of the lithium-air secondary cell (4).

FIG. 6 shows the results of the constant current charge and discharge test on the lithium-air secondary cell (4) (3 cycles), and FIG. 7 shows the conductivity of the gel-form solid electrolyte after discharge, obtained by the alternating current impedance measurement.

As shown in FIG. 6, the capacity was not significantly decreased after 3 cycles, which showed that the cycle characteristic is improved by providing the rest for 24 hours after each of charge and discharge.

Also as shown in FIG. 7, the conductivity of the gel electrolyte after 3 cycle-discharge was not largely changed, and the value was stable. This suggests that the stability of the gel electrolyte is improved by providing the prolonged resting time period after each of charge and discharge, which contributes to improvement in cycle characteristics of the lithium-air cells.

Example 5

Impedance Characteristic of Gel Used for Gel-Form Solid Electrolyte

The impedance characteristic was evaluated for each of the two types of gel used as the gel-form solid electrolytes in the lithium-air secondary cells (2) and (3) manufactured in Example 2 and Example 3.

A gel was produced with the same electrolyte solution used for the gel-form solid electrolyte of Example 3, except that the amount of EC added to the electrolyte solution was changed (1 M LiN(SO$_2$CF$_3$)$_2$ GBL:DEC:EC=1:1:3 (mass ratio)), and the impedance characteristics were evaluated for this gel and the aforementioned gels. The alternating current impedance was measured at 25° C., and the equipment used was an electrochemical analyzer Solartron 1280+1267, manufactured by Solartron Analytical Company.

Figure 8:
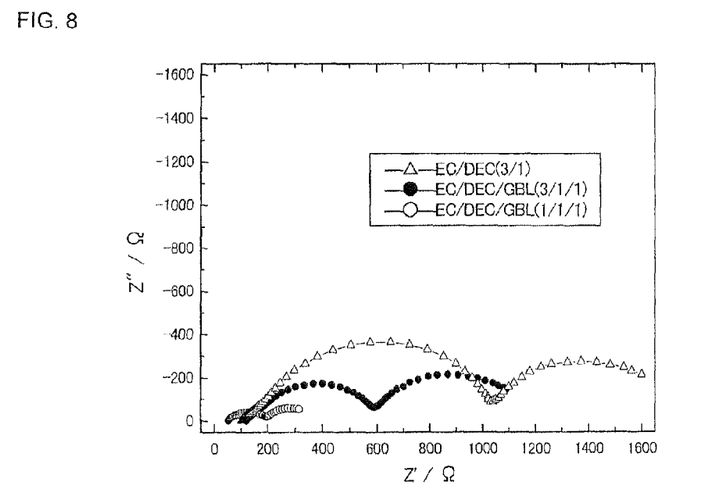
FIG. 8 is a graph showing the impedance characteristics of the gels used in the Examples.

The obtained results are shown in FIG. 8.

As shown in FIG. 8, the gel used in Example 2, in which the mass ratio of EC:DEC was 3:1, had a relatively large resistance value, and its conductivity at room temperature was around log ($\sigma$/S cm$^{-1}$)=−2.

Meanwhile, the value of conductivity was improved by adding GBL to an electrolyte solution, and by increasing a ratio of DEC. The gel used in Example 3, in which the mass ratio of EC:DEC:GBL was 1:1:1 showed good conductivity, around log ($\sigma$/S cm$^{-1}$)=−1.7, at room temperature. This suggests that improvement of conductivity of the gel resulting from addition of GBL and the like is one of reasons for the excellent cycle characteristic of charge and discharge in the lithium-air secondary cell of Example 3 described above.

Example 6

Impedance Characteristics of Gel Used for Gel-Form Solid Electrolyte and Electrolyte Solution (Temperature Dependence)

The alternating current impedance was measured by using the gel-form solid electrolyte (electrolyte solution (1 M LiN(SO$_2$CF$_3$)$_2$ GBL:DEC:EC=1:1:1 (mass ratio)) manufactured in Example 3. The alternating current impedance was measured in the same manner as in Example 5 except that the measurement was conducted under temperatures changed within the range from −20° C. to 50° C.

For a comparison, the alternating current impedance was measured in the same manner as described above except that the lipid peptide-type gelator of Synthesis Example 1 was not added to the electrolyte solution used in Example 3 to prevent gelation of the electrolyte (the state of an electrolyte solution (liquid) is maintained).

Figure 9:
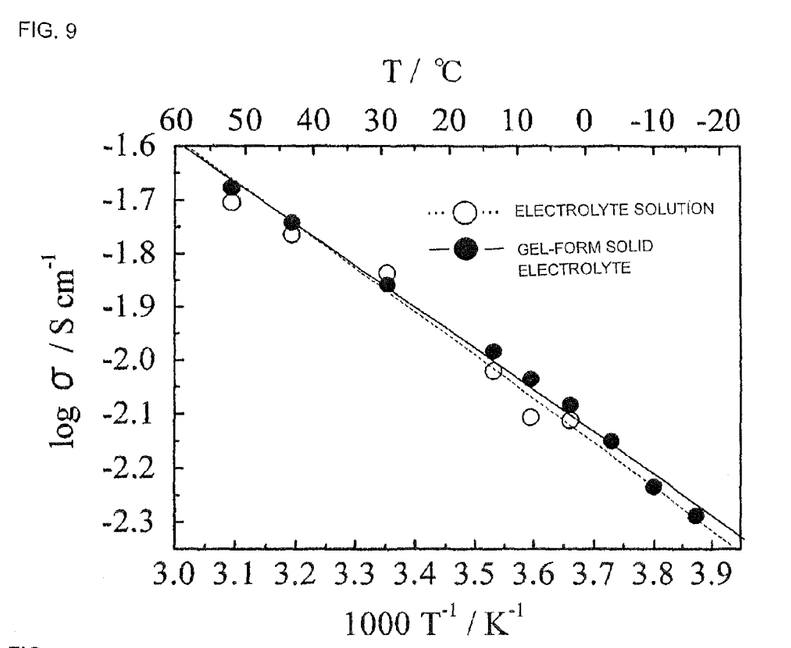
FIG. 9 is a graph showing results of the alternating current impedance measurement by using the gel-form solid electrolyte and the liquid electrolyte (electrolysis) used in the Examples (Arrhenius plot).

FIG. 9 shows each of the obtained results (Arrhenius plot).

The active energy Ea obtained from the Arrhenius plot shown in FIG. 9 was 0.155 (eV) for the gel-form solid electrolyte and was 0.149 (eV) for the electrolyte solution.

Specifically, although conductivity of a conventionally developed gel electrolyte using a gelator has been considered to be decreased upon gelation, the gel obtained by using a lipid peptide-type gelator defined by the present invention showed conductivity comparable to that of the electrolyte solution even when gelated. In addition, conductivity at a low temperature, which has been a problem of gel electrolytes, was extremely high, and thus the gel electrolyte can be used even at −20° C.

Example 7

Impedance Characteristic of Gel Used for Gel-Form Solid Electrolyte (Temporal Change)

The alternating current impedance of the gel-form solid electrolyte was temporally measured for a period from (1 day) after the preparation until 30 days had passed. The alternating current impedance measurement was conducted by using the gel-form solid electrolyte and the measuring condition of Example 6, except that the measuring temperature was set to 25° C.

Figure 10:
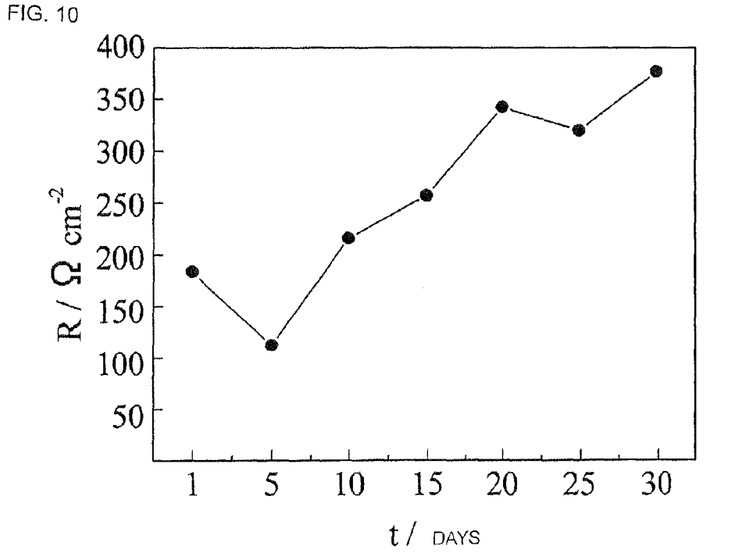
FIG. 10 is a graph showing results of the alternating current impedance measurement conducted in a time-dependent manner on the gel-form solid electrolyte used in the Examples.

The obtained results are shown in FIG. 10. In FIG. 10, the horizontal axis indicates the elapsed time (days), and the vertical axis indicates the interfacial resistance value of metal lithium (electrode) and the gel electrolyte, which was obtained from the alternating current impedance measurement.

As shown in FIG. 10, the interfacial resistance value after 30 days had passed was not significantly increased, which suggests that the gel-form solid electrolyte was highly stable to metal lithium.

Example 8

Manufacture of Lithium-Air Secondary Cell (4), Charge and Discharge Test and Alternating Current Impedance Measurement at 0° C.

The lithium-air secondary cell (4) was prepared in the same manner as in Example 1 except that the compositions of the air electrode and the electrolyte solution were changed.
<Air Electrode>
The air electrode used in Example 2 was used.
<Electrolyte Solution>
The electrolyte solution used in Example 3 was used.
<Charge and Discharge Test and Alternating Current Impedance Measurement>
The charge and discharge test was conducted at a constant current, a charge and discharge current density of 0.1 mA/cm$^2$, and a voltage range of 2.0 V to 4.5 V. In this test, the lithium-air secondary cell was cooled to 0° C.

Note that a prolonged resting time period was provided after each of charge and discharge. Specifically, the cell was rested at 2.5 V for 24 hours after discharge was completed, and was rested at 4.3 V for 24 hours after charge was completed.

Alternating current impedance was measured after discharge was completed (the measurement instrument: an electrochemical analyzer Solartron 1280+1267, manufactured by Solartron Analytical Company).

Figure 11:
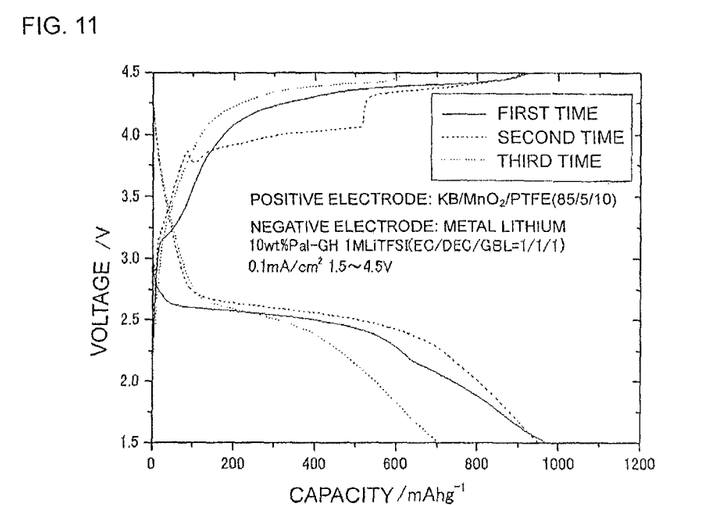
FIG. 11 is a graph showing results of the constant current charge and discharge test on the lithium-air secondary cell (4) conducted at 0° C.
Figure 12:
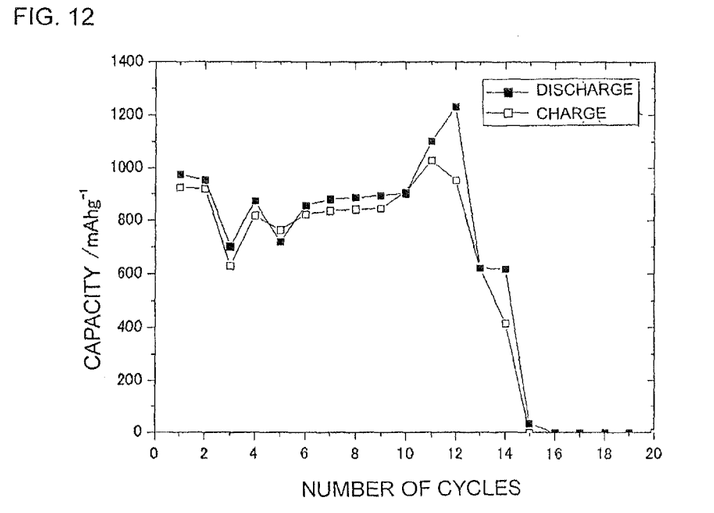
FIG. 12 is a graph showing results of the charge and discharge cycle characteristic test for the lithium-air secondary cell (4) conducted at 0° C.

FIG. 11 shows the results of the constant current charge and discharge test on the lithium-air secondary cell (4) (3 cycles), and FIG. 12 shows the result of the cycle characteristic test for charge and discharge.

As shown in FIG. 11, even when the cell was cooled to 0° C., the charging and discharging voltage and its capacity was not significantly decreased compared to the test conducted at room temperature. In general, electrical conductivity of a conventional solid electrolyte gel is extremely decreased upon cooling to 0° C., and the charge and discharge function of the secondary cell is not fulfilled anymore; however, the electrolyte gel of the present invention sufficiently works as a secondary cell even at 0° C.

As shown in FIG. 12, its cycle characteristic also functions as much as that at a room temperature.

Example 9

Manufacture of Lithium-Air Secondary Cell (5) and Charge and Discharge Test

The lithium-air secondary cell (5) was prepared in the same manner as in Example 1 except that the compositions of the air electrode and the electrolyte solution were changed.

<Air Electrode>

The air electrode used in Example 2 was used.

<Electrolyte Solution>

γ-butyrolactone (GBL, manufactured by Kishida Chemical Co., Ltd., an organic solvent for lithium primary/secondary/polymer cells & lithium ion capacitors, 3.3 g), DEC (manufactured by Kishida Chemical Co., Ltd., an organic solvent for lithium primary/secondary/polymer cells & lithium ion capacitors, 4.4 g), and EC (manufactured by Kishida Chemical Co., Ltd., an organic solvent for lithium primary/secondary/polymer cells & lithium ion capacitors, 2.2 g) were mixed. Subsequently, $LiN(SO_2CF_3)_2$ (manufactured by Kishida Chemical Co., Ltd., an electrolyte for lithium primary/secondary/polymer cells & lithium ion capacitors, 2.9 g) was dissolved in the mixed solvent to prepare the electrolyte solution (1 M $LiN(SO_2CF_3)_2$ GBL:DEC:EC=1.5:2:1 (mass ratio)).

<Charge and Discharge Test>

The charge and discharge test was conducted at a constant current, a charge and discharge current of 0.1 mA/cm², and a voltage range of 2.0 V to 4.5 V.

Figure 13:
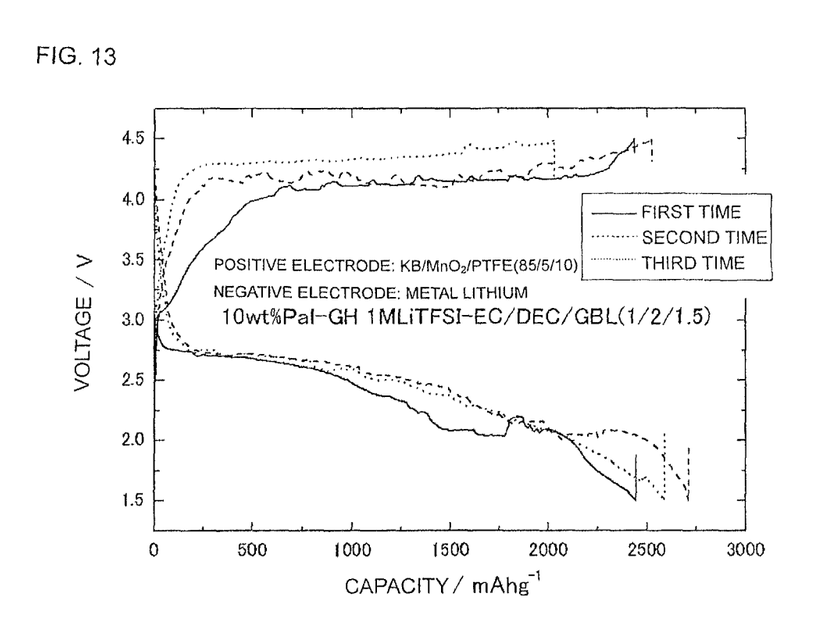
FIG. 13 is a graph showing results of the constant current charge and discharge test on a lithium-air secondary cell (5).

FIG. 13 shows the results of the constant current charge and discharge test on the lithium-air secondary cell (5) (3 cycles).

As shown in FIG. 13, the charge and discharge capacity of the lithium-air secondary cell (5) was improved.

DESCRIPTION OF THE REFERENCE NUMERALS

1 Lithium-air secondary cell
2 Cell
3 Negative electrode
4 Gel-form solid electrolyte
5 Separator
6 Air electrode (serves also as a working electrode)
7 Counter electrode (serves also as a reference electrode)
8 Perforated lid

The invention claimed is:

1. A lithium-air secondary cell comprising:
an air electrode;
a negative electrode containing metal lithium or a lithium-containing material; and
a gel-form solid electrolyte, wherein
the gel-form solid electrolyte contains a solid electrolyte salt, a solvent, and a lipid peptide-type gelator composed of at least one of compounds of Formulae (1) to (3):

(where $R^1$ is a $C_{9-23}$ aliphatic group, $R^2$ is a hydrogen atom or a $C_{1-4}$ alkyl group optionally having a $C_1$ or $C_2$ branched chain, $R^3$ is a —$(CH_2)_n$—X group, n is a number of 1 to 4, and X is an amino group, a guanidino group, a —$CONH_2$ group, a 5-membered ring optionally having 1 to 3 nitrogen atoms, a 6-membered ring optionally having 1 to 3 nitrogen atoms, or a condensed heterocycle that is composed of a 5-membered ring and a 6-membered ring and optionally has 1 to 3 nitrogen atoms), (where $R^4$ is a $C_{9-23}$ aliphatic group, each of $R^5$ to $R^7$ is independently a hydrogen atom, a $C_{1-4}$ alkyl group optionally having a $C_1$ or $C_2$ branched chain, or a —$(CH_2)_n$—X group, n is a number of 1 to 4, and X is an amino group, a guanidino group, a —$CONH_2$ group, a 5-membered ring optionally having 1 to 3 nitrogen atoms, a 6-membered ring optionally having 1 to 3 nitrogen atoms, or a condensed heterocycle that is composed of a 5-membered ring and a 6-membered ring and optionally has 1 to 3 nitrogen atoms), and (where $R^8$ is a $C_{9-23}$ aliphatic group, each of $R^9$ to $R^{12}$ is independently a hydrogen atom, a $C_{1-4}$ alkyl group optionally having a $C_1$ or $C_2$ branched chain, or a —$(CH_2)_n$—X group, n is a number of 1 to 4, and X is an amino group, a guanidino group, a —$CONH_2$ group, a 5-membered ring optionally having 1 to 3 nitrogen atoms, a 6-membered ring optionally having 1 to 3 nitrogen atoms, or a condensed heterocycle that is composed of a 5-membered ring and a 6-membered ring and optionally has 1 to 3 nitrogen atoms), and
pharmaceutically acceptable salts of the compounds.

2. The lithium-air secondary cell according to claim 1, wherein
the solvent contained in the gel-form solid electrolyte includes a chain carbonate ester selected from the group consisting of dimethyl carbonate (DMC), diethyl carbonate (DEC), and ethylmethyl carbonate, and either a cyclic carbonate ester or an ether compound.

3. The lithium-air secondary cell according to claim 2, wherein
the cyclic carbonate ester is present and is ethylene carbonate or propylene carbonate.

4. The lithium-air secondary cell according to claim 2, wherein
the ether compound is present and is 1,2-dimethoxyethane.

5. The lithium-air secondary cell according to claim 1, wherein
the solvent contained in the gel-form solid electrolyte includes a chain carbonate ester selected from the group consisting of dimethyl carbonate (DMC), diethyl carbonate (DEC), and ethylmethyl carbonate, a cyclic carbonate ester, and a cyclic carboxylate ester.

6. The lithium-air secondary cell according to claim 5, wherein
the cyclic carboxylate ester is γ-butyrolactone.

7. The lithium-air secondary cell according to claim 1, wherein
the air electrode is composed by including a porous carbon or a fine carbon that supports, as a catalyst, at least one of metal oxides selected from the group consisting of a perovskite oxide, a manganese oxide, a cobalt oxide, a nickel oxide, an iron oxide, and a copper oxide.

8. The lithium-air secondary cell according to claim 7, wherein
the air electrode is composed by including a porous carbon supporting a manganese oxide.

9. The lithium-air secondary cell according to claim 1, wherein
the negative electrode is metal lithium.

10. The lithium-air secondary cell according to claim 1, wherein
the solid electrolyte salt is selected from the group consisting of $LiN(SO_2C_2F_5)_2$, $LiPF_6$, $LiBF_4$, $LiClO_4$, $LiAsF_6$, $LiCF_3SO_3$, $LiN(SO_2CF_3)_2$, and mixtures of any of $LiN(SO_2C_2F_5)_2$, $LiPF_6$, $LiBF_4$, $LiClO_4$, $LiAsF_6$, $LiCF_3SO_3$, and $LiN(SO_2CF_3)_2$.

11. The lithium-air secondary cell according to claim 1, wherein
the lipid peptide-type gelator is composed of at least one of the compounds of Formula (1).

12. The lithium-air secondary cell according to claim 1, wherein
the lipid peptide-type gelator is composed of at least one of the compounds of Formula (2).

13. The lithium-air secondary cell according to claim 1, wherein
the lipid peptide-type gelator is composed of at least one of the compounds of Formula (3).

* * * * *